United States Patent
Suryavanshi et al.

(10) Patent No.: US 9,225,579 B2
(45) Date of Patent: Dec. 29, 2015

(54) RENEWING REGISTRATIONS FOR A PLURALITY OF CLIENT APPLICATIONS THAT ARE ASSOCIATED WITH THE SAME HOST SERVER VIA AN EXPLICIT PIGGYBACKING SCHEME

(71) Applicant: QUALCOMM Incorporated, San Diego, CA (US)

(72) Inventors: Vijay A. Suryavanshi, San Diego, CA (US); Mark A. Maggenti, San Diego, CA (US); Mohammed Ataur Rahman Shuman, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 399 days.

(21) Appl. No.: 13/786,312

(22) Filed: Mar. 5, 2013

(65) Prior Publication Data
US 2014/0258368 A1 Sep. 11, 2014

(51) Int. Cl.
*G06F 15/16* (2006.01)
*H04L 29/06* (2006.01)

(52) U.S. Cl.
CPC .................. *H04L 29/06047* (2013.01)

(58) Field of Classification Search
USPC ........................................................ 709/203
See application file for complete search history.

(56) References Cited

U.S. PATENT DOCUMENTS

| | | |
|---|---|---|
| 6,874,028 B1 | 3/2005 | Feinleib et al. |
| 7,457,781 B1 * | 11/2008 | Weaver et al. ................. 705/64 |
| 7,480,254 B2 | 1/2009 | Mayer |
| 8,054,780 B1 * | 11/2011 | Manroa et al. ................ 370/328 |
| 2008/0222660 A1 | 9/2008 | Tavi et al. |
| 2011/0177792 A1 | 7/2011 | Bruno et al. |
| 2012/0221738 A1 | 8/2012 | Schroeder, Jr. et al. |
| 2013/0039282 A1 * | 2/2013 | Dhere .......................... 370/329 |

FOREIGN PATENT DOCUMENTS

JP       10177548 A    6/1998

OTHER PUBLICATIONS

International Search Report and Written Opinion—PCT/US2014/20397—ISA/EPO—Sep. 4, 2014.

\* cited by examiner

*Primary Examiner* — Hee Soo Kim
(74) *Attorney, Agent, or Firm* — Muncy, Geissler, Olds & Lowe, P.C.

(57) ABSTRACT

In an embodiment, a server registers first and seconds client applications on the same client device. The first client application on a client device obtains, from the server or some other source, application-to-application communicative information for facilitating communication between the first and second client applications. Based on the application-to-application communicative information, the first client application configures a given registration request message that includes (i) a request for renewing the first client application's registration with the server, and (ii) a request for renewing the second client application's registration with the same server, and transmits the given registration request message to the server. The server renews the registrations for the first and second client applications in response to the given registration request message.

18 Claims, 11 Drawing Sheets

RENEWING REGISTRATIONS FOR A PLURALITY OF CLIENT APPLICATIONS THAT ARE ASSOCIATED WITH THE SAME HOST SERVER VIA AN EXPLICIT PIGGYBACKING SCHEME

BACKGROUND OF THE INVENTION

1. Field of the Invention

Embodiments of the invention relate to renewing registrations for a plurality of client applications that are associated with the same host server via an explicit piggybacking scheme.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

It is typical for client devices (e.g., mobile devices such as cell phones) that use the above-noted communication systems or other types of access networks (e.g., WiFi, etc.) to maintain registrations for client applications with one or more host servers. For example, a user may be logged into his/her Facebook account with a Facebook host server via a Facebook client application on his/her cellular phone, a user may be logged onto his/her email account with an email host server via an email client application on his/her cellular phone, etc. These client application registrations are typically temporary and require periodic renewals or else the client applications' will be deregistered by their respective host servers. It is also possible that two or more client applications maintain active registrations with the same host server. In this case, the two or more client applications will typically be required to transmit independent registration renewal requests for extending or renewing the registrations of the respective client applications.

SUMMARY

In an embodiment, a server registers first and second client applications on the same client device. The first client application on a client device obtains, from the server or some other source, application-to-application communicative information for facilitating communication between the first and second client applications. Based on the application-to-application communicative information, the first client application configures a given registration request message that includes (i) a request for renewing the first client application's registration with the server, and (ii) a request for renewing the second client application's registration with the same server, and transmits the given registration request message to the server. The server renews the registrations for the first and second client applications in response to the given registration request message.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
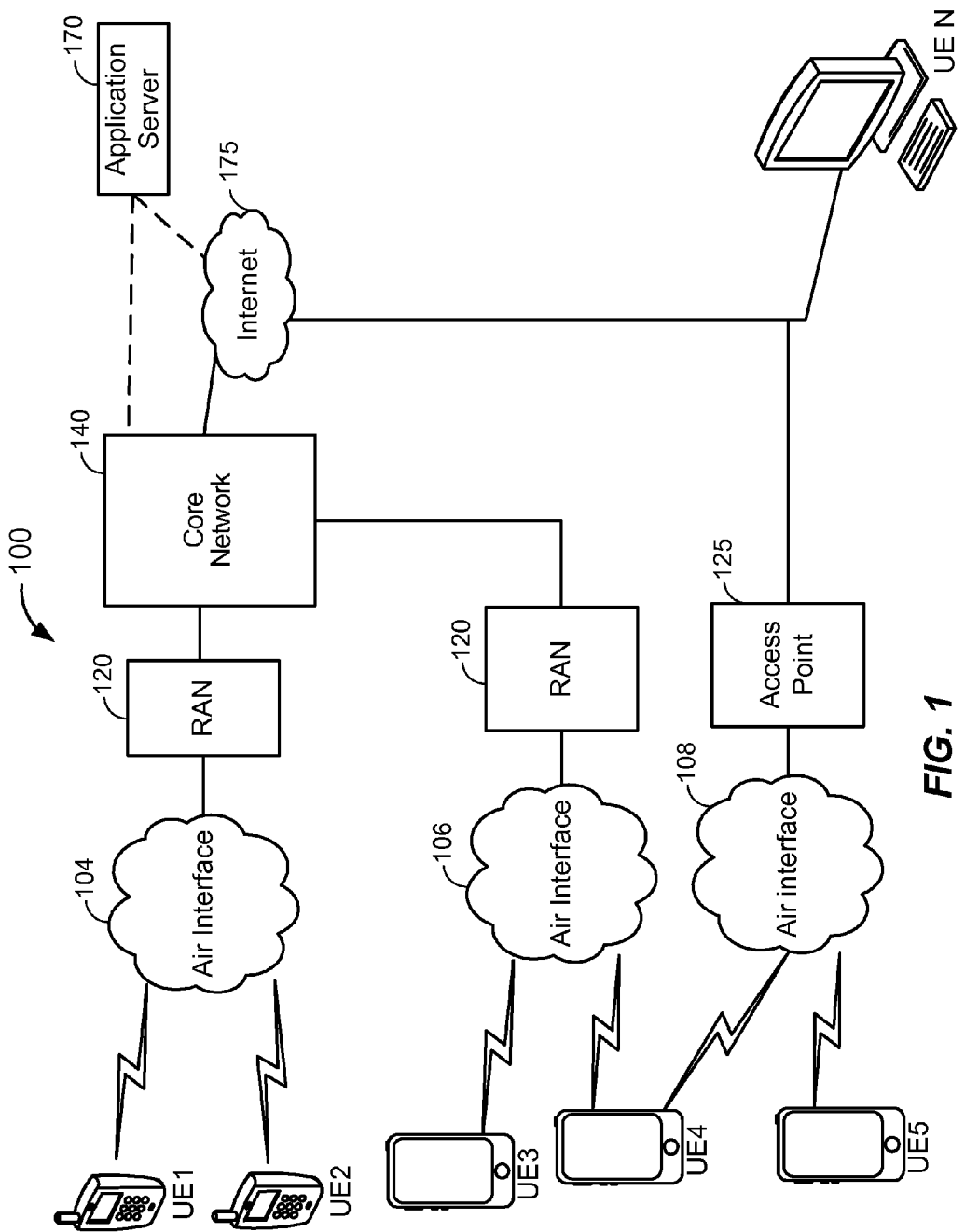
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175, and/or to provide content (e.g., web page downloads) to the UEs.

Figure 2:
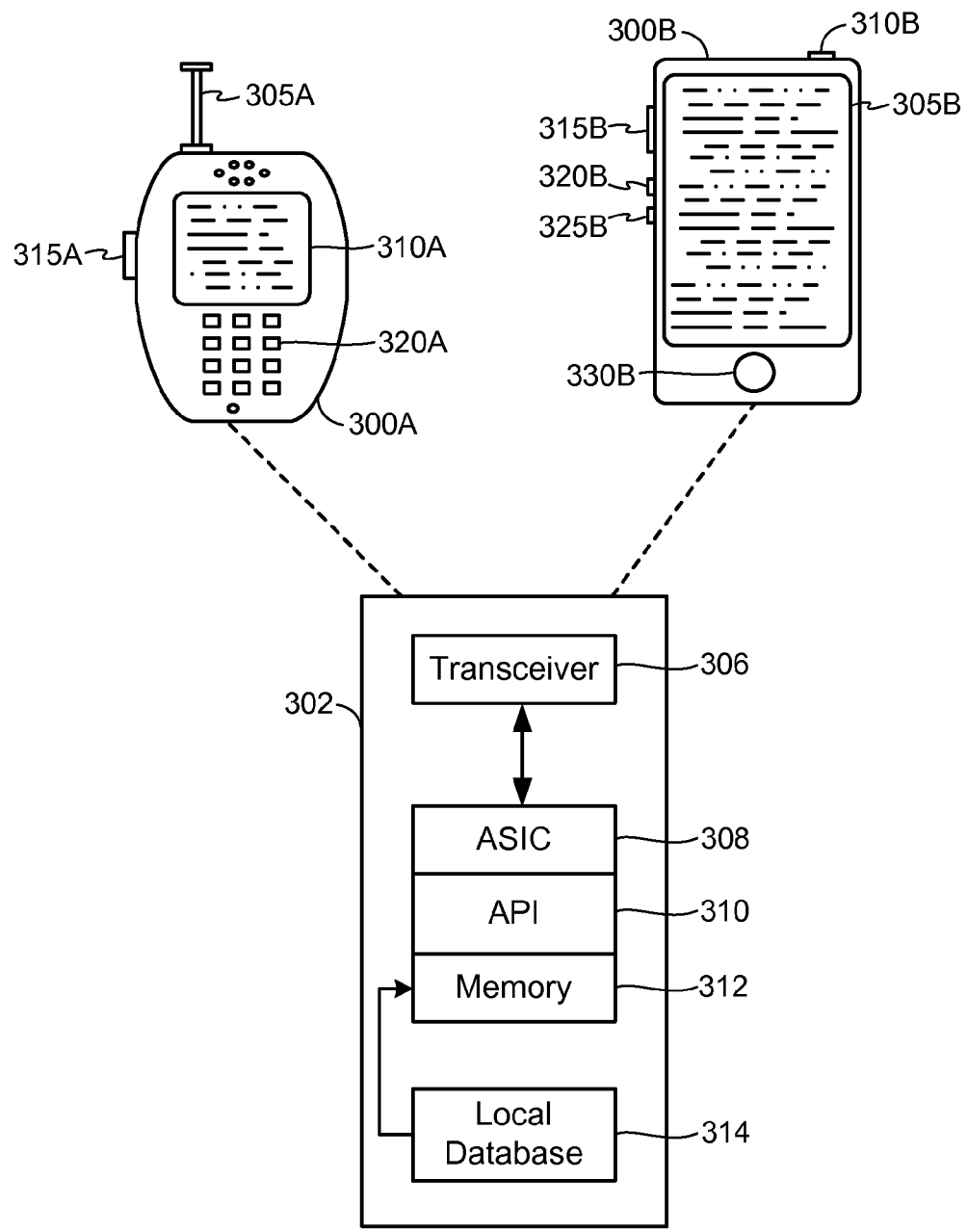
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 300A is illustrated as a calling telephone and UE 300B is illustrated as a touchscreen device (e.g., a smart phone, a tablet computer, etc.). As shown in FIG. 2, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 2. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 2 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
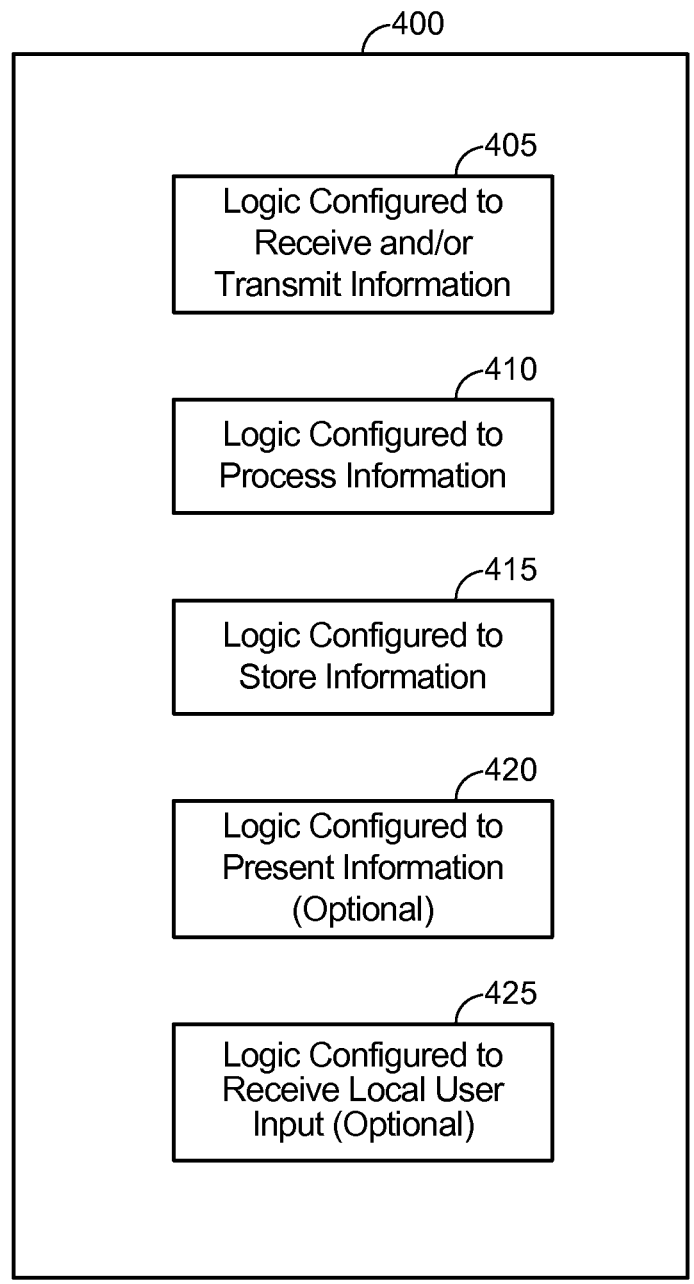
FIG. 3 illustrates a communication device that includes logic configured to perform functionality in accordance with an embodiment of the invention.

FIG. 3 illustrates a communication device 400 that includes logic configured to perform functionality. The communication device 400 can correspond to any of the above-noted communication devices, including but not limited to UEs 300A or 300B, any component of the RAN 120, any component of the core network 140, any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 3, the communication device 400 includes logic configured to receive and/or transmit information 405. In an example, if the communication device 400 corresponds to a wireless communications device (e.g., UE 300A or 300B, AP 125, a BS, Node B or eNodeB in the RAN 120, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., the application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 3, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 3, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 3, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 2, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers such as the application server 170, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 3, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 2, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers such as the application server 170, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 3, while the configured logics of 405 through 425 are shown as separate or distinct blocks in FIG. 3, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

It is typical for client devices to maintain registrations for client applications with one or more host servers. For example, a user may be logged into his/her Facebook account with a Facebook host server via a Facebook client application on his/her UE, a user may be logged onto his/her email account with an email host server via an email client application on his/her UE, etc. These client application registrations are typically temporary and require periodic renewals or else the client applications' will be deregistered by their respective host servers. It is also possible that two or more client applications running on the same device maintain active registrations with the same host server. In this case, the two or more client applications will typically be required to transmit independent registration renewal requests from the same device for extending or renewing the registrations of the respective client applications.

Figure 4:
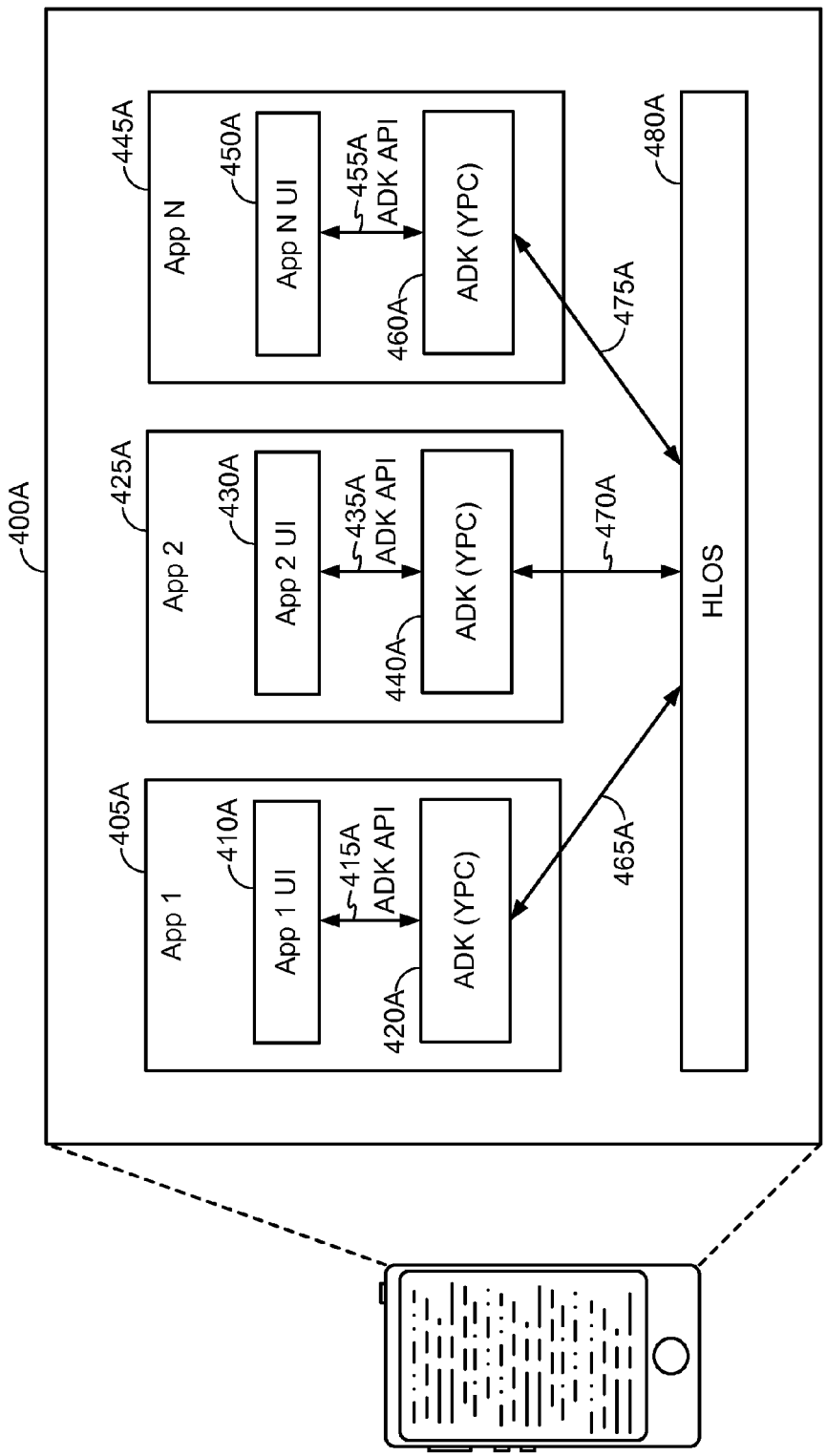
FIG. 4 illustrates an example of client architecture that can be implemented on a client device in accordance with an embodiment of the invention.

FIG. 4 illustrates an example of client architecture that can be implemented on a client device 400A (e.g., such as UE 300A or 300B of FIG. 2) in accordance with an embodiment of the invention. The client architecture may be representative of an Android operating system (OS) device, an iOS device, a Windows OS device or a device executing some other OS. Referring to FIG. 4, the client architecture of the client device 400A includes a first client application ("App1") 405A which includes an App1 user interface (UI) 410A, a logical interface 415A (e.g., an Accessory Development Kit (ADK) API) that connects the App1 UI 410A to a high-level operating system (HLOS) interface module 420A (e.g., an ADK module or ADK (YPC)). The client architecture of the client device 400A further includes a second client application ("App2") 425A which includes an App2 UI 430A, a logical interface 435A (e.g., an ADK API) that connects the App2 UI 430A to an HLOS interface module 440A (e.g., an ADK module or ADK (YPC)). The client architecture of the client device 400A further includes at least one additional client application ("AppN") 445A which each include an AppN UI 450A, a logical interface 455A (e.g., an ADK API) that connects the AppN UI 450A to an HLOS interface module 460A (e.g., an ADK module or ADK (YPC)). The HLOS interface modules 420A, 440A and 460A for Apps 1 . . . N are each connected to an HLOS 480A via HLOS interfaces 465A, 470A and 475A, respectively, which in turn connects the respective Apps 1 . . . N to other components of the client device 400A.

Figure 5:
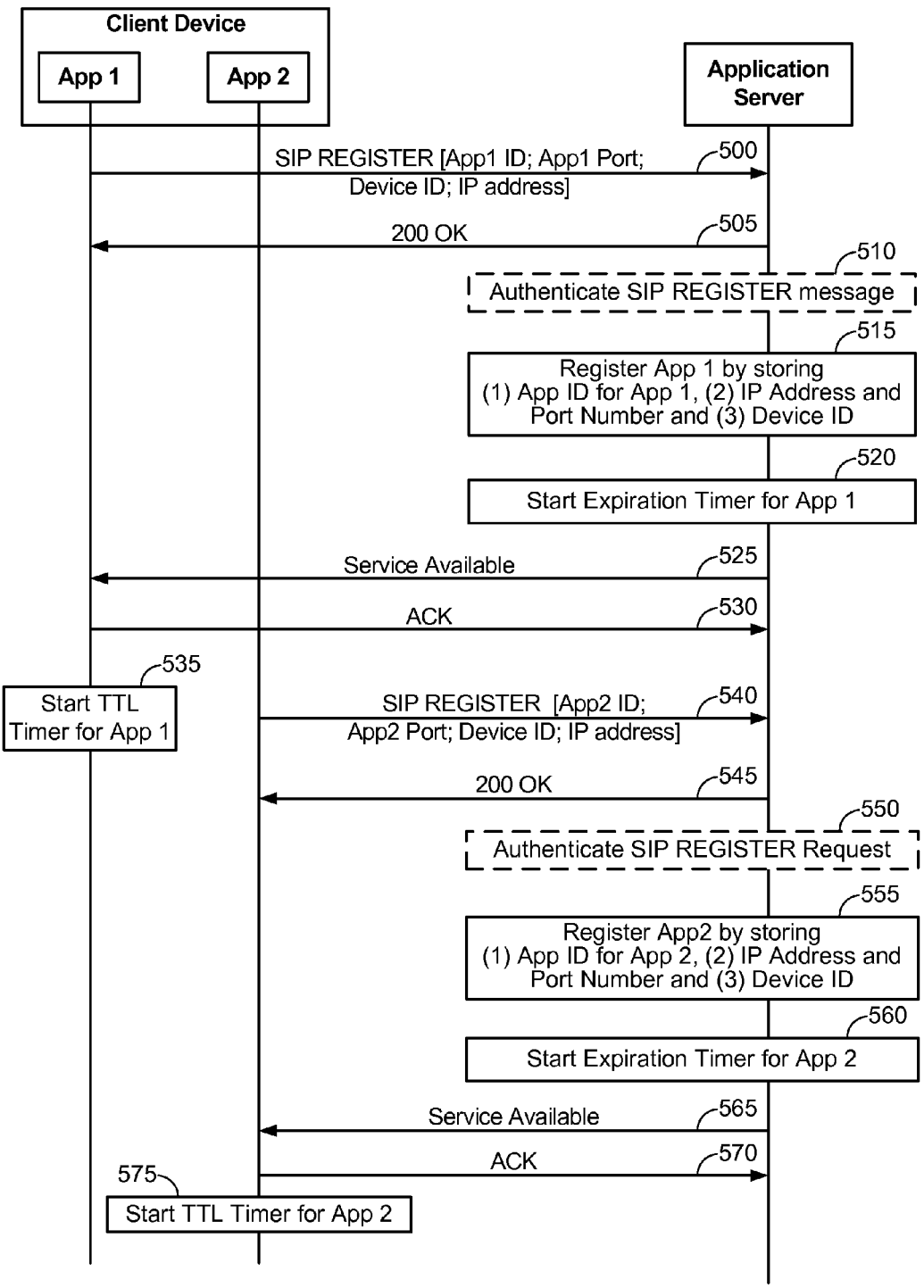
FIG. 5 illustrates an example registration procedure that can be implemented for App1 and App2 as shown in FIG. 4.

FIG. 5 illustrates an example registration procedure that can be implemented for App1 and App2 as shown in FIG. 4. In FIG. 5, it is assumed that App1 and App2 are each configured to be supported by and registered with the same host server ("application server 170"). This assumption is not necessarily true for each of Apps 1 . . . N (e.g., App3 may be supported by a different host server, App4 may not be supported by any host server, etc.). For example, App1 and App2 can be two distinct VoIP applications on the client device 400A that obtain service through a VoIP server, two distinct Facebook-related client applications on the client device 400A that obtain service through a Facebook server (e.g., a photoviewing app and a status update app), etc.

Referring to FIG. 5, App1 transmits a registration message to the application server 170, 500. In FIG. 5, the registration message of 500 is shown as implemented via a Session Initiation Protocol (SIP) REGISTER message that includes an App1 identifier (ID), an IP address and port number used by App1 on the client device 400A, a device identifier (ID) of the client device 400A. In an example, the port number used by App1 may be unique to App1, while the IP address used by App1 can also be shared with other client applications so that the client applications can be distinguished by their port number. The application server can thereby use the IP address in conjunction with App1's port number to route messages from external devices to App1 on the client device 400A. Also, the App1 ID may be implemented as a globally unique ID that distinguishes App1 from other client applications. Thus, any other client device with App1 can use the same App1 ID for App1. Also, the device ID can correspond to a globally unique identifier for the client device 400A that distinguishes client device 400A from any other client device, such as a MAC address. For convenience of explanation, the registration messages described throughout this application will refer to SIP REGISTER messages in accordance with SIP, but it will be appreciated that other embodiments can be directed to non-SIP implementations.

Referring to FIG. 5, at 505, the application server 170 acknowledges (ACKs) the SIP REGISTER message from 500 by sending a 200 OK message to App1 on the client device 400A based on the IP address of the client device 400A and App1's port number from the SIP REGISTER message of 500. Also, in response to the SIP REGISTER message from 500, the application server 170 optionally authenticates App1's SIP REGISTER message, 510. If the SIP REGISTER message from 500 is properly authenticated at 510 (or if authentication is skipped), the application server 170 registers App1 by establishing a record for App1 that includes (i) App1's ID, (ii) the IP address and port number associated with App1, and (iii) the device ID associated with the client device 400A, 515. The application server 170 also starts an expiration timer for the registration of App1, 520, whereby the application server 170 is configured to de-register App1 upon expiration of App1's expiration timer.

The application server 170 sends a message to App1 on the client device 400A that indicates service is available for App1, 525, and App1 sends an ACK in response to the service available message, 530. At 535, App1 starts a time to live (TTL) timer that is configured to expire before the expiration timer for App1 that is running at the application server 170. Expiration of App1's TTL timer will trigger App1 to transmit another SIP REGISTER message for renewing or extending App1's registration with the application server 170 by resetting App1's expiration timer.

At some later point in time, App2 transmits a SIP REGISTER message 540 to the application server which includes an App2 ID, the IP address and port number used by App2 on the client device 400A and the device ID of the client device 400A. As noted above, the IP address for App2 can be the same IP address used by App1, while the respective port numbers for App1 and App2 are different.

Referring to FIG. 5, at 545, the application server 170 ACKs the SIP REGISTER message from 540 by sending a 200 OK message to App2 on the client device 400A based on the IP address of the client device 400A and App2's port number from the SIP REGISTER message of 540. Also in response to the SIP REGISTER message from 540, the application server 170 optionally authenticates App2's SIP REGISTER message, 550. If the SIP REGISTER message from 540 is properly authenticated at 550 (or if authentication is skipped), the application server 170 registers App2 by establishing a record for App2 that includes (i) App2's ID, (ii) the IP address and port number associated with App2, and (iii) the device ID associated with the client device 400A, 555. The application server 170 also starts an expiration timer for the registration of App2, 560, whereby the application server 170 is configured to de-register App2 upon expiration of App2's expiration timer.

The application server 170 sends a message to App2 on the client device 400A that indicates service is available for App2, 565, and App2 sends an ACK in response to the service available message, 570. At 575, App2 starts a TTL timer that is configured to expire before the expiration timer for App2 that is running at the application server 170. Expiration of App2's TTL timer will trigger App2 to transmit another SIP REGISTER message for renewing or extending App2's registration with the application server 170 by resetting App2's expiration timer.

Figure 6:
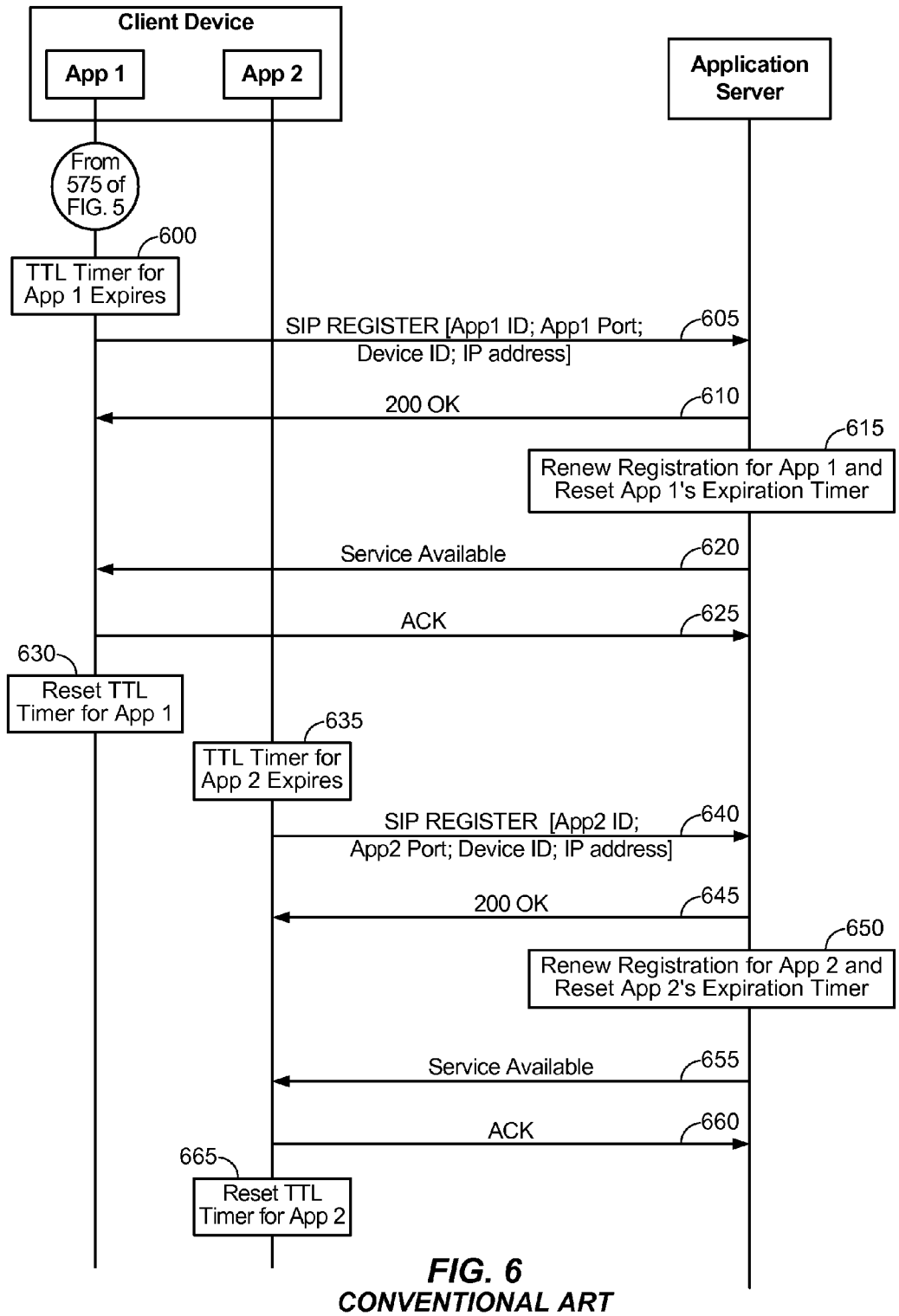
FIG. 6 illustrates a conventional mechanism for renewing or extending the registrations for App1 and App2 after execution of the process of FIG. 5.

FIG. 6 illustrates a conventional mechanism for renewing or extending the registrations for App1 and App2 after execution of the process of FIG. 5. Referring to FIG. 6, at some point after the client device 400A starts App2's TTL timer at 575, the client device 400A determines that App1's TTL timer has expired, 600. This triggers App1 to transmit another SIP REGISTER message at 605 that functions to request the application server 170 to extend or renew App1's registration with the application server 170. The application server 170 ACKs the SIP REGISTER message from 605 with a 200 OK message, 610, and the application server 170 also renews the registration for App1 by resetting or extending App1's expiration timer, 615. As will be appreciated, the operation of 615 pushes back the point in time at which App1's registration would otherwise expire. The application server 170 notifies App1 that its registration has been renewed by sending a service available message, 620, and App1 ACKs the service available message, 625. App1 resets or restarts the App1 TTL timer at 630, such that App1 will send another SIP REGIS- TER message for renewing App1's registration with the application server 170 the next time the App1 TTL timer expires, and so on.

Referring to FIG. 6, the client device 400A determines that App2's TTL timer has expired, 635. This triggers App2 to transmit another SIP REGISTER message at 640 that functions to request the application server 170 to extend or renew App2's registration with the application server 170. The application server 170 ACKs the SIP REGISTER message from 640 with a 200 OK message, 645, and the application server 170 also renews the registration for App2 by resetting or extending App2's expiration timer, 650. As will be appreciated, the operation of 650 pushes back the point in time at which App2's registration would otherwise expire. The application server 170 notifies App2 that its registration has been renewed by sending a service available message, 655, and App2 ACKs the service available message, 660. App2 resets or restarts the App2 TTL timer at 665, such that App2 will send another SIP REGISTER message for renewing App2's registration with the application server 170 the next time the App2 TTL timer expires, and so on.

While different client applications usually register themselves with different host servers (e.g., a Facebook client application registers with a Facebook server, an email client application registers with an email server, etc.), it is becoming more common for different client applications to maintain separate registrations with the same host server, as shown in FIGS. 5-6. However, the conventional approach shown in FIG. 6 whereby each client application independently engages in its own registration renewal procedure can be wasteful in terms of resource usage when multiple client applications maintain their registrations with the same host server (e.g., the client device is required to acquire a traffic channel and transmit a registration renewal request each time any of its TTL timers expire for any of its client applications, even if two or more of the client applications expire in close proximity). Accordingly, embodiments of the invention relate to reducing the amount of messaging used to renew registrations for multiple client applications that are registered with the same host server by consolidating or aggregating registration renewal requests for different client applications into a single transmission.

Figure 7:
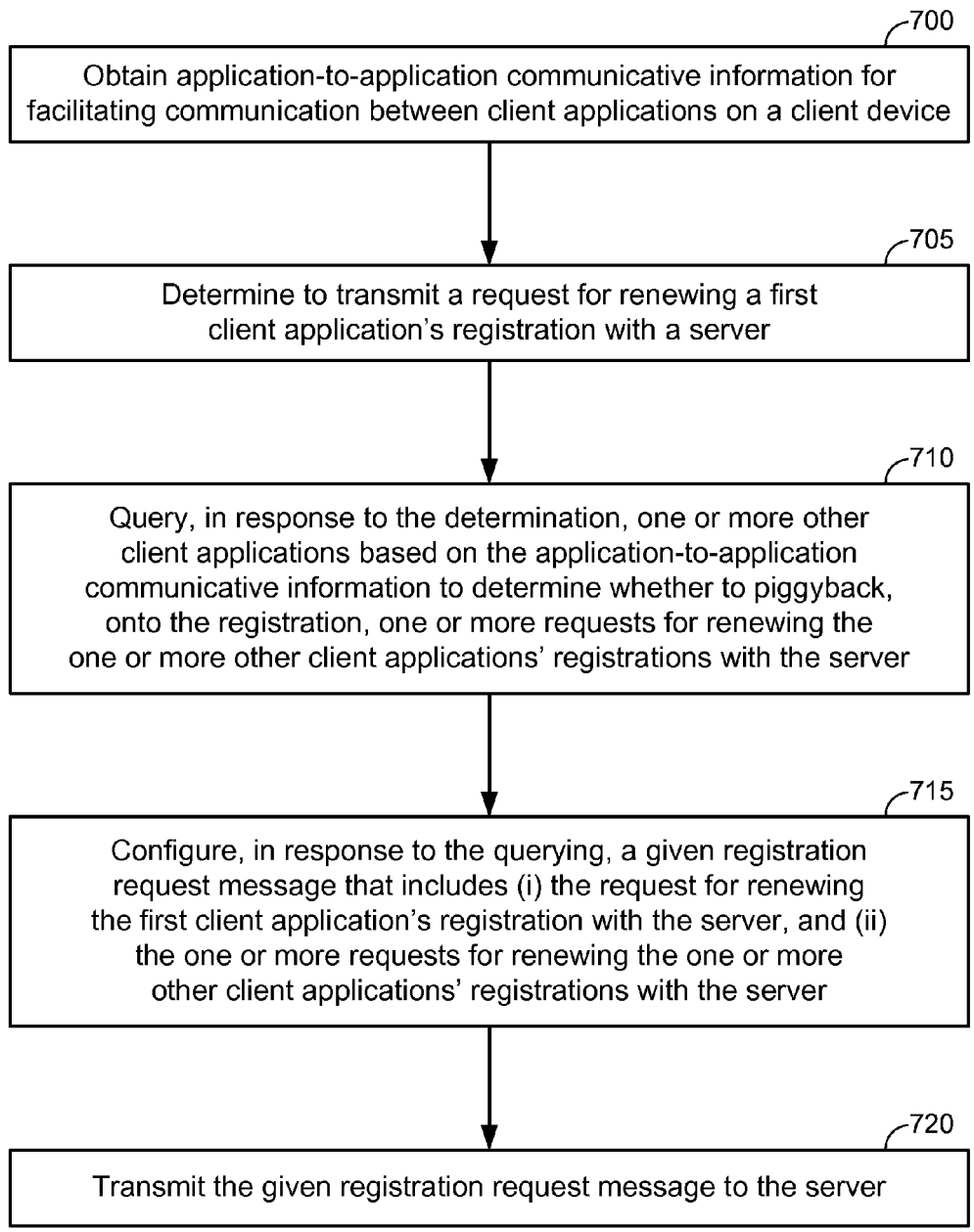
FIG. 7 illustrates a process of operating a client device including a plurality of client applications that are supported by an application server in accordance with an embodiment of the invention.

FIG. 7 illustrates a process of operating a client device (e.g., such as client device 400A) including a plurality of client applications that are supported by the application server 170 in accordance with an embodiment of the invention. Referring to FIG. 7, at 700, a first client application ("App1") on the client device 400A obtains application-to-application communicative information for facilitating communication between App1 and one or more other client applications configured for execution on the client device 400A. For convenience of explanation, the one or more other client applications will be described as corresponding to App2, although it is understood that the application-to-application communicative information can be used by App1 to communicate with other client applications as well.

Referring to FIG. 7, the application-to-application communicative information obtained at 700 can correspond to any information which permits App1 to interact with App2 on the client device 400A. As an example, the application-to-application communicative information can correspond to Inter-process communication (IPC) information (which can be alternatively referred to as Inter-thread communication information or Inter-application communication information). As will be discussed below in more detail with respect to FIGS. 9-10, the application-to-application communicative information can be delivered to App1 via the application server 170, in an example. However, the application-to-application communicative information is not necessarily limited to IPC information. For example, certain device OSs may natively support communication between its resident applications, in which case the application-to-application communicative information is simply a leveraging of a natively supported OS feature. In another example, App1 and App2 may not directly communicate with each other, but instead App1 could simply access status data for App2 that is stored in memory on the client device 400A. Thus, the application-to-application communicative information can correspond in some cases to App1 retrieving App2-specific information without directly engaging with App2. Thereby, the application-to-application communicative information is intended to be interpreted broadly so long as the application-to-application communicative information is capable of facilitating the functionality discussed below.

Referring to FIG. 7, App1 determines to transmit a request for renewing App1's registration with the application server 170, 705. As an example, the determination of 705 can be based upon App1's TTL timer expiring on the client device 400A. At 710, App1 uses the application-to-application communicative information to query whether any other client applications on the client device 400A maintain registrations with the application server 170, and if so, if any of those registrations are approaching expiration. If App1 detects one or more such client applications, App1 determines to piggyback registration renewal request(s) for those applications onto the registration renewal request message to be transmitted by App1. For example, the application-to-application communicative information can be used to retrieve the amount of time remaining on App2's TTL timer before expiration, and App1 may determine to piggyback a registration renewal request for App2 onto its own registration renewal request if the retrieved amount of time remaining on App2's TTL timer is below a threshold.

At 715, under the assumption that App1 determines to piggyback a registration renewal request for App2 onto App1's registration renewal message, App1 configures a given registration request message (e.g., a SIP REGISTER message) that includes (i) a request for renewing App1's registration with the application server 170, and (ii) a request for renewing App2's registration with the application server 170. As will be appreciated, if App1 determines to piggyback registration renewal requests for more than one other client application at 710, then more than one extra registration renewal request will be piggybacked onto the given registration request message at 715. At 720, App1 transmits the given registration request message to the application server 170.

Figure 8:
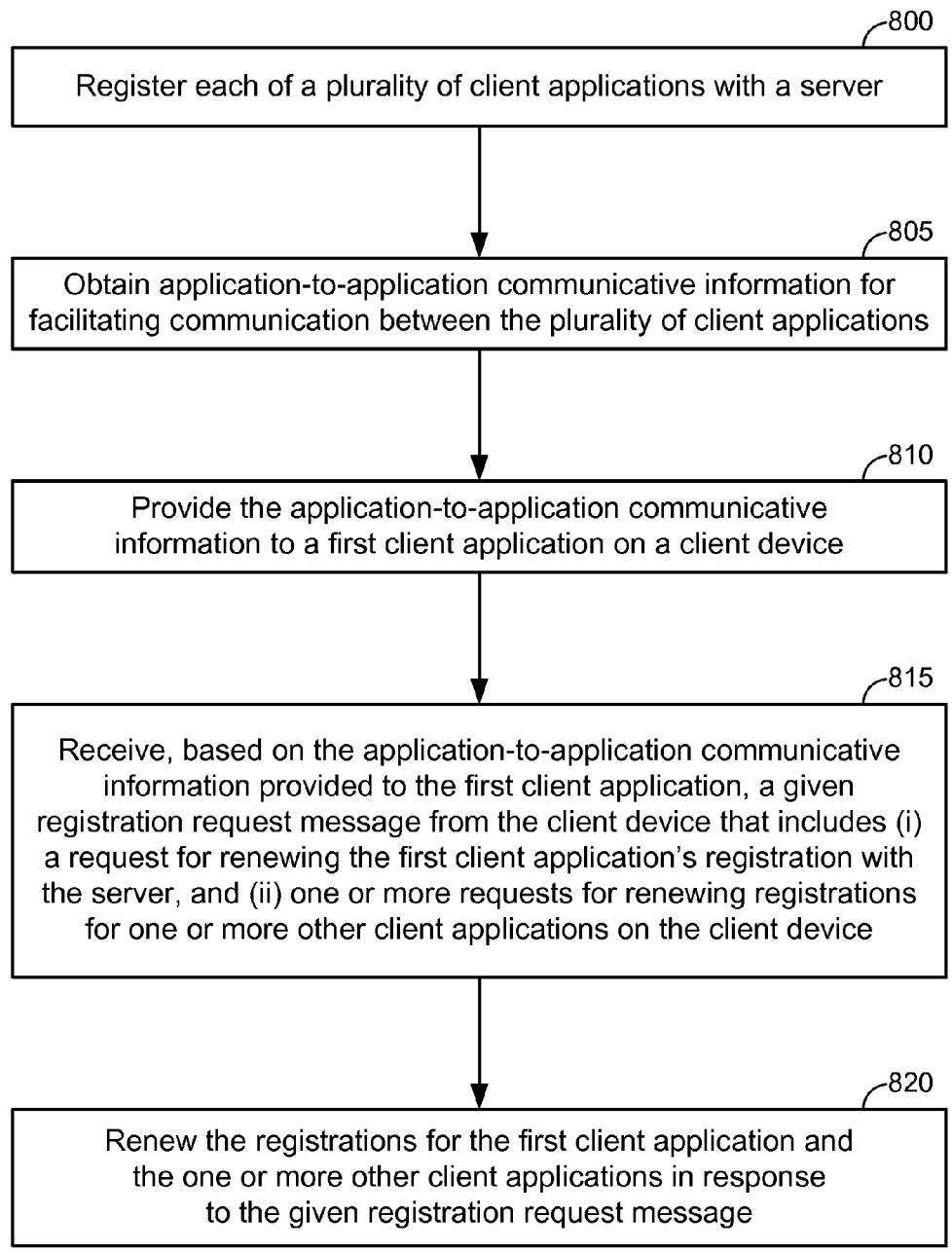
FIG. 8 illustrates operation of the application server in conjunction with the process of FIG. 7 in accordance with an embodiment of the invention.

FIG. 8 illustrates operation of the application server 170 in conjunction with the process of FIG. 7 in accordance with an embodiment of the invention. Referring to FIG. 8, the application server 170 registers App1 and App2, 800 (e.g., as in 510-520 and 550-560 of FIG. 5). The application server 170 obtains application-to-application communicative information by which App1 and App2 (and potentially other client applications as well) can communicate with each other on the client device 400A, 805. An example implementation of 805 is described below in more detail with respect to FIG. 9. The application server 170 delivers the application-to-application communicative information to App1 on the client device 400A, 810 (e.g., as in 700 of FIG. 7). An example implementation of 810 is described below in more detail with respect to FIG. 10.

Based on the application-to-application communicative information provided to App1 at 810, the application server 170 receives a given registration request message from App1 that includes (i) a request for renewing App1's registration with the application server 170, and (ii) a request for renewing App2's registration with the application server 170, 815 (e.g., as in 720 of FIG. 7). To put another way, App2's registration renewal request is piggybacked onto the registration renewal request for App1. In response to the given registration request message, the application server 170 extends or renews registrations for both App1 and App2, 820 (e.g., by resetting their respective registration expiration timers).

Figure 9:
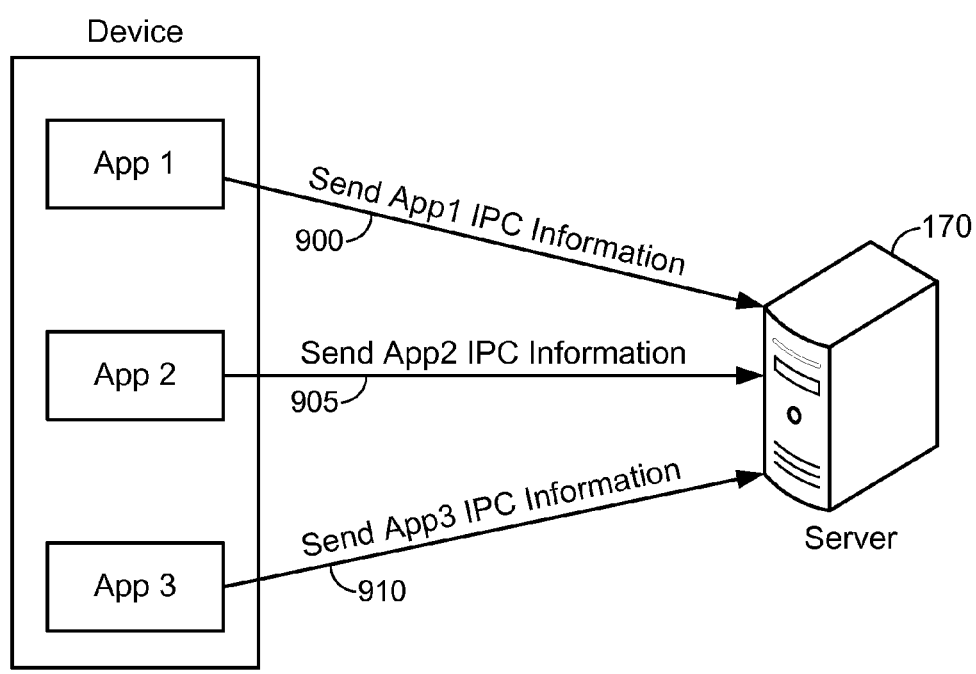
FIG. 9 illustrates an example of uploading application-to-application communicative information from client applications on the client device to the application server in accordance with an embodiment of the invention.

FIG. 9 illustrates an example of uploading application-to-application communicative information from client applications on the client device 400A to the application server 170 in accordance with an embodiment of the invention. In particular, FIG. 9 illustrates an implementation example of 805 of FIG. 8. In FIG. 9, the application-to-application communicative information being uploaded corresponds to IPC information. At 900, App1 transmits or uploads App1 IPC information to the application server 170, whereby the App1 IPC information is configured to be used by other client applications (e.g., App2 and App3) on the client device 400A for communicating with App1. At 905, App2 transmits or uploads App2 IPC information to the application server 170, whereby the App2 IPC information is configured to be used by other client applications (e.g., Apps 1 and 3) on the client device 400A for communicating with App2. At 910, App3 transmits or uploads App3 IPC information to the application server 170, whereby the App3 IPC information is configured to be used by other client applications (e.g., App1 and App2) on the client device 400A for communicating with App3. The uploads of 900, 905 and 910 do not necessarily occur at the same time. In an example, the respective uploads of 900, 905 and 910 may be performed during an initial registration procedure. For example, the upload of the App1 IPC information at 900 may occur in conjunction with the registration of App1 between 500-535 of FIG. 5, and these respective registrations can occur at different times.

Referring to FIG. 9, the IPC information being uploaded can be based in part upon the type of OS implemented on the client device. For example, if the client device runs iOS, the IPC information can include URLs associated with the client applications, such that App1 reports its URL(s) as the App1 IPC information at 900, App2 reports its URL(s) as the App2 IPC information at 905 and App3 reports its URL(s) as the App3 IPC information at 910. In another example, if the client device runs an Android OS, the IPC information can include the Broadcast Intent associated with the client applications, such that App1 reports its Broadcast Intent as the App1 IPC information at 900, App2 reports its Broadcast Intent as the App2 IPC information at 905 and App3 reports its Broadcast Intent as the App3 IPC information at 910.

Figure 10A:
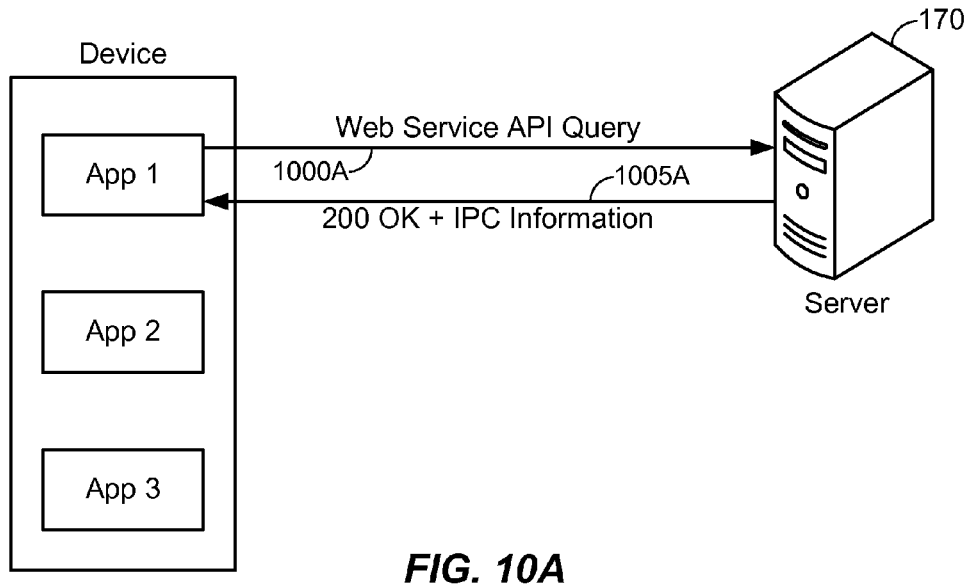
FIG. 10A illustrates a process of downloading or retrieving inter-process communication (IPC) information collected by the application server at FIG. 9 in accordance with an embodiment of the invention.

FIG. 10A illustrates a process of downloading or retrieving the IPC information collected by the application server 170 at FIG. 9 in accordance with an embodiment of the invention. Referring to FIG. 10A, the client device 400A is provisioned with a Web Service API that is configured to permit client applications on the client device 400A to transmit queries to the application server 170 for retrieving IPC information for other client applications. At 1000A, App1 uses the Web Service API to transmit a query for the IPC information. The application server 170 can then retrieve and/or aggregate the IPC information for each other client application on the client device 400A (App2 and App3). The application server 170 bundles the retrieved IPC information for App2 and App3 into a 200 OK message transmitted to the client device 400A at 1005A in response to the Web Service API query. The IPC information acquisition procedure shown in FIG. 10A can be implemented at any time, either during a registration procedure (e.g., 500-535 of FIG. 5) or during some other period.

Figure 10B:
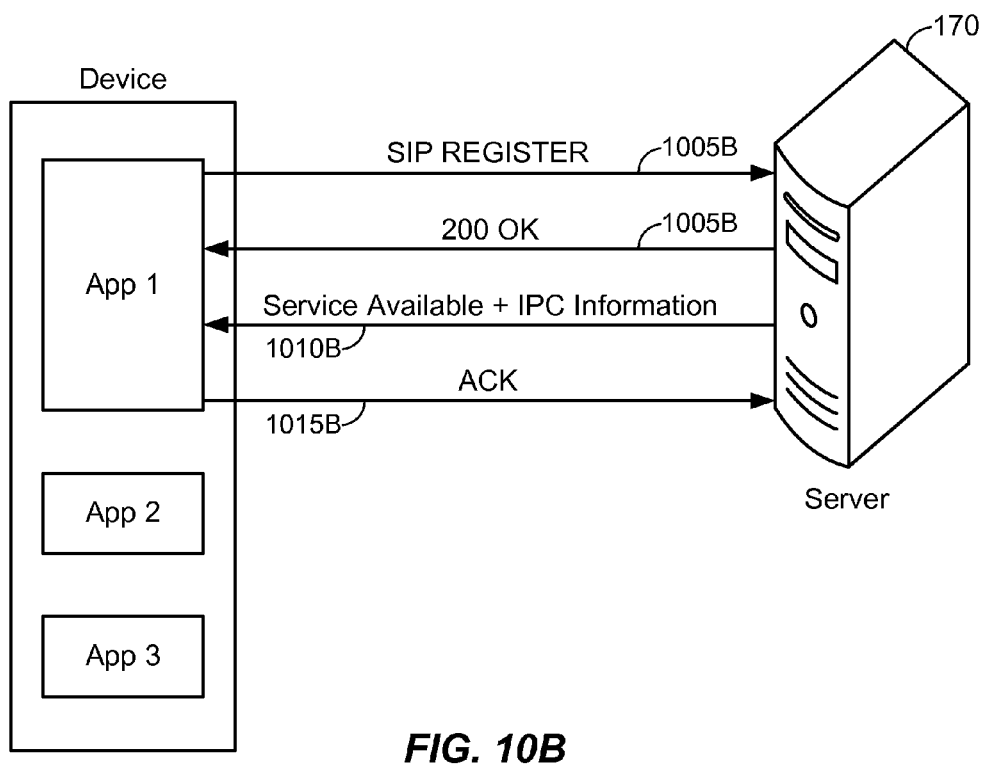
FIG. 10B illustrates a process of downloading or retrieving IPC information collected by the application server at FIG. 9 in accordance with another embodiment of the invention.

FIG. 10B illustrates a process of downloading or retrieving the IPC information collected by the application server 170 at FIG. 9 in accordance with another embodiment of the invention. Unlike FIG. 10A, FIG. 10B relates to the IPC information being acquired in conjunction with either an initial registration procedure or a registration renewal procedure. At 1000B, App1 transmits a SIP REGISTER message to the application server 170 to request registration or registration renewal for at least App1. The application server 170 ACKs the SIP REGISTER message with a 200 OK message, 1005B. The application server 170 then indicates the successful registration of App1 via a service available message, 1010B. The application server 170 retrieves and/or aggregates the IPC information for each other client application on the client device 400A (App2 and App3), and the application server bundles the retrieved IPC information for App2 and App 3 into a service available message that indicates the successful registration of App1, 1010B. App1 then ACKs the service available message, 1015B.

Figure 11:
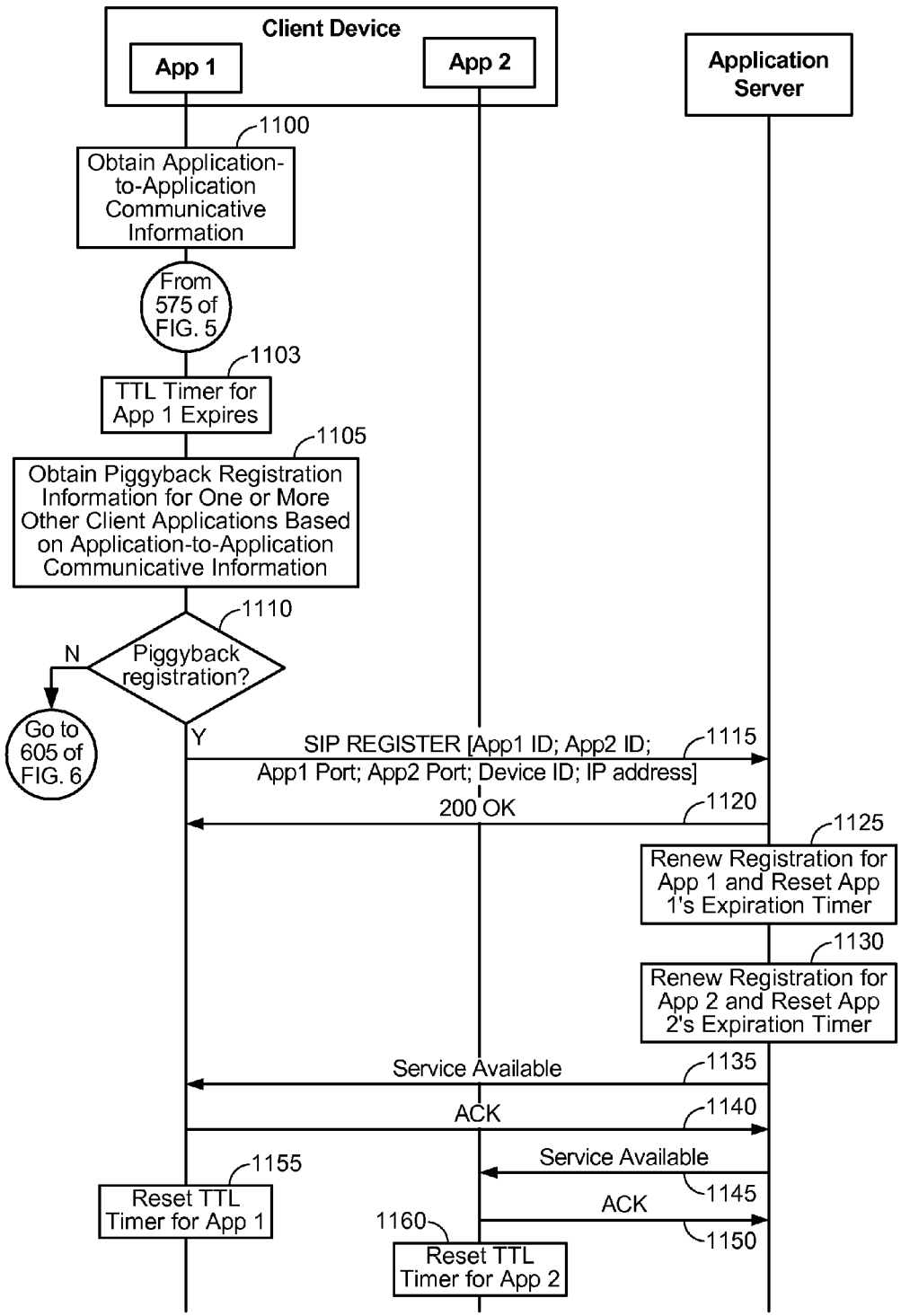
FIG. 11 illustrates a continuation of the process of FIG. 5 in accordance with an embodiment of the invention.

FIG. 11 illustrates a continuation of the process of FIG. 5 in accordance with an embodiment of the invention. Referring to FIG. 11, at some point before execution of the process of FIG. 5, assume that the App1 is provisioned with application-to-application communicative information for facilitating between client applications on the client device 400A, 1100 (e.g., similar to 700 of FIG. 7). It will be appreciated that the application-to-application communicative information obtained at 1100 can be obtained by App1 via a previous execution of 700 of FIG. 7 or 810 of FIG. 8, which can occur either via a Web Service API procedure (e.g., 1000A-1005A of FIG. 10A) or during a previous registration or registration renewal procedure (e.g., 1000B-1015B of FIG. 10B). At some point after the client device 400A starts App2's TTL timer at 575, the client device 400A determines that App1's TTL timer has expired, 1103. Instead of simply transmitting a SIP REGISTER message for App1 at this point, App1 determines piggyback registration information for one or more other client applications on the client device 400A based on the application-to-application communicative information obtained at 1100, 1105 (e.g., as in 710 of FIG. 7). At 1110, App1 determines whether to piggyback registrations for any of the other client applications based on the piggyback registration information obtained at 1105.

In an example, at 1105 of FIG. 11, App1 can use the application-to-application communicative information to determine if any TTL timers for any other client applications that are registered with the application server 170 are going to expire within a threshold period of time. If not, App1 determines at 1110 not to piggyback a registration renewal for any other client applications onto App1's registration request, and the process advances to 605 of FIG. 6. If so, App1 determines at 1110 to piggyback a registration renewal for the detected same-server soon-expiring client applications onto App1's registration request at 1110. In the embodiment of FIG. 11, assume that App1 determines to piggyback an App2 registration renewal request at 1110.

Accordingly, App1 configures and then transmits a SIP REGISTER message at 1115 that functions to request the application server 170 to extend or renew both registrations for both App1 and App2 with the application server 170 (e.g., as in 715 and 720 of FIG. 7 or 815 of FIG. 8). In particular, the SIP REGISTER message transmitted at 1115 includes the App1 ID, the App1 port number, the App2 ID, the App2 port number, the device ID, and the IP address used by both App1 and App2. At 1120, the application server 170 ACKs the SIP REGISTER message from 1115 by sending a 200 OK message to App1 on the client device 400A based on the IP address of the client device 400A and App1's port number from the SIP REGISTER message of 1115. The application server 170 renews the registration for App1 by resetting or extending App1's expiration timer, 1125, and the application server 170 also renews the registration for App2 by resetting or extending App2's expiration timer, 1130. By contrast, in FIG. 6, separate SIP REGISTER messages were required for renewing registrations for App1 and App2 despite App1 and App2 being registered with the same server (i.e., the application server 170). As will be appreciated, reducing the number of SIP REGISTER messages required for extending the App1 and App2 registrations with the application server 170 as compared with the conventional FIG. 6 implementation improves resource usage efficiencies in the system.

The application server 170 notifies App1 that its registration has been renewed by sending a service available message, 1135, and App1 ACKs the service available message, 1140. The application server 170 also notifies App2 that its registration has been renewed by sending a service available message, 1145, and App2 ACKs the service available message, 1150. While FIG. 11 illustrates two independent Service Available messages being transmitted from the application server 170 to App1 and App2 on the client device 400A at 1135 and 1145, in an alternative embodiment, one Service Available message can be piggybacked on the other similar to the piggybacking that occurs for the SIP REGISTER message at 1115. For example, the Service Available message 1135 can be configured to indicate, to App1, that App2's registration has also been renewed (e.g., by including an identification of App2 in addition to App1 in the Service Available message). App1 can then notify App2 using the application-to-application communicative information. In this scenario, additional security and authentication protocols may be implemented for App2 to accept App1's indication of registration renewal (e.g., because App1 may be less trusted by App2 than the application server 170 itself). In yet another alternative embodiment, the ACKs transmitted at 1140 and 1150 can instead be consolidated or piggybacked. For example, if App1 notifies App2 of App2's registration renewal based on a piggybacked Service Available message, and App1 is able to verify that App2 accepts the registration renewal notification for App2, App1 can then send a piggybacked ACK for App2 along with its own ACK at 1140. The piggybacked ACK can be configured similarly to the SIP REGISTER message from 1115 in the sense that both App1 and App2 are identified.

Irrespective of how the Service Available messages and ACKs are exchanged between 1135-1150, App1 resets or restarts the App1 TTL timer at 1155, and App2 resets or restarts the App2 TTL timer at 1160. While not shown explicitly in FIG. 11, if the App2 TTL timer is the next TTL timer to expire, App2 can operate similarly to App1 in FIG. 11 whereby App2 uses application-to-application communicative information to evaluate whether to piggyback App1's registration request onto the App2 registration request, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a client device configured to execute a plurality of client applications that are supported by a server, comprising:
   obtaining, by a first of the plurality of client applications, application-to-application communicative information for facilitating communication between the first client application and one or more other client applications from the plurality of client applications;
   determining, by the first client application, to transmit a request for renewing the first client application's registration with the server;
   querying, by the first client application in response to the determination, the one or more other client applications based on the application-to-application communicative information to determine whether to piggyback, onto the registration, one or more requests for renewing the one or more other client applications' registrations with the server;
   configuring, in response to the querying, a given registration request message that includes (i) the request for renewing the first client application's registration with the server, and (ii) the one or more requests for renewing the one or more other client applications' registrations with the server; and
   transmitting the given registration request message to the server.

2. The method of claim 1, wherein the application-to-application communicative information corresponds to inter-process communication (IPC) information.

3. The method of claim 1, wherein the obtaining includes:
   transmitting a request to the server for the application-to-application communicative information; and
   receiving the application-to-application communicative information from the server in response to the transmitted request for the application-to-application communicative information.

4. The method of claim 3, wherein the transmitted request for the application-to-application communicative information is transmitted in conjunction with a registration procedure or registration renewal procedure for the first client application.

5. The method of claim 3, wherein the transmitted request for the application-to-application communicative information is transmitted independent of a registration procedure or registration renewal procedure for the first client application.

6. The method of claim 1, wherein the obtaining includes:
   transmitting, by the first client application, a request to register with the server or to renew the first client application's registration with the server; and
   receiving the application-to-application communicative information from the server in response to the transmitted request to register with the server or to renew the first client application's registration with the server.

7. The method of claim 1, wherein the obtaining includes:
   acquiring the application-to-application communicative information locally on the client device.

8. A method of operating a server configured to support a plurality of client applications that are configured for execution on a client device, comprising:
   registering each of the plurality of client applications with the server;
   obtaining application-to-application communicative information for facilitating communication between the plurality of client applications;
   providing the application-to-application communicative information to a first of the plurality of client applications;
   receiving, based on the application-to-application communicative information provided to the first client application, a given registration request message from the client device that includes (i) a request for renewing the first client application's registration with the server, and (ii) one or more requests for renewing registrations for one or more other client applications from the plurality of client applications; and
   renewing the registrations for the first client application and the one or more other client applications in response to the given registration request message.

9. The method of claim 8, wherein the application-to-application communicative information corresponds to inter-process communication (IPC) information.

10. The method of claim 9, wherein the providing includes:
    receiving a request at the server for the application-to-application communicative information; and
    transmitting the application-to-application communicative information to the client device in response to the received request for the application-to-application communicative information.

11. The method of claim 8, wherein the providing includes:
    receiving, from the first client application, a request to register with the server or to renew the first client application's registration with the server; and
    transmitting the application-to-application communicative information to the first client application in response to the received request to register with the server or to renew the first client application's registration with the server.

12. The method of claim 8, wherein the providing is independent of a registration procedure or registration renewal procedure for the first client application.

13. A client device configured to execute a plurality of client applications that are supported by a server, comprising:
    means for obtaining, by a first of the plurality of client applications, application-to-application communicative information for facilitating communication between the first client application and one or more other client applications from the plurality of client applications;
    means for determining, by the first client application, to transmit a request for renewing the first client application's registration with the server;
    means for querying, by the first client application in response to the determination, the one or more other client applications based on the application-to-application communicative information to determine whether to piggyback, onto the registration, one or more requests for renewing the one or more other client applications' registrations with the server;

means for configuring, in response to the querying, a given registration request message that includes (i) the request for renewing the first client application's registration with the server, and (ii) the one or more requests for renewing the one or more other client applications' registrations with the server; and means for transmitting the given registration request message to the server.

14. A server configured to support a plurality of client applications that are configured for execution on a client device, comprising:

means for registering each of the plurality of client applications with the server;

means for obtain application-to-application communicative information for facilitating communication between the plurality of client applications;

means for providing the application-to-application communicative information to a first of the plurality of client applications;

means for receiving, based on the application-to-application communicative information provided to the first client application, a given registration request message from the client device that includes (i) a request for renewing the first client application's registration with the server, and (ii) one or more requests for renewing registrations for one or more other client applications from the plurality of client applications; and means for renewing the registrations for the first client application and the one or more other client applications in response to the given registration request message.

15. A client device configured to execute a plurality of client applications that are supported by a server, comprising:

a processor and memory configured to:
obtain, by a first of the plurality of client applications, application-to-application communicative information for facilitating communication between the first client application and one or more other client applications from the plurality of client applications, determine, by the first client application, to transmit a request for renewing the first client application's registration with the server, query, by the first client application in response to the determination, the one or more other client applications based on the application-to-application communicative information to determine whether to piggyback, onto the registration, one or more requests for renewing the one or more other client applications' registrations with the server, configure, in response to the querying, a given registration request message that includes (i) the request for renewing the first client application's registration with the server, and (ii) the one or more requests for renewing the one or more other client applications' registrations with the server; and a transceiver configured to transmit the given registration request message to the server.

16. A server configured to support a plurality of client applications that are configured for execution on a client device, comprising:

a processor and memory configured to:
register each of the plurality of client applications with the server, obtain application-to-application communicative information for facilitating communication between the plurality of client applications; and a communications interface circuit configured to provide the application-to-application communicative information to a first of the plurality of client applications, receive, based on the application-to-application communicative information provided to the first client application, a given registration request message from the client device that includes (i) a request for renewing the first client application's registration with the server, and (ii) one or more requests for renewing registrations for one or more other client applications from the plurality of client applications, wherein the processor and the memory are further configured to renew the registrations for the first client application and the one or more other client applications in response to the given registration request message.

17. A non-transitory computer-readable medium containing instructions stored thereon, which, when executed by a client device configured to execute a plurality of client applications that are supported by a server, cause the client device to perform operations, the instructions comprising:

at least one instruction for causing the client device to obtain, by a first of the plurality of client applications, application-to-application communicative information for facilitating communication between the first client application and one or more other client applications from the plurality of client applications;

at least one instruction for causing the client device to determine, by the first client application, to transmit a request for renewing the first client application's registration with the server;

at least one instruction for causing the client device to query, by the first client application in response to the determination, the one or more other client applications based on the application-to-application communicative information to determine whether to piggyback, onto the registration, one or more requests for renewing the one or more other client applications' registrations with the server;

at least one instruction for causing the client device to configure, in response to the querying, a given registration request message that includes (i) the request for renewing the first client application's registration with the server, and (ii) the one or more requests for renewing the one or more other client applications' registrations with the server; and at least one instruction for causing the client device to transmit the given registration request message to the server.

18. A non-transitory computer-readable medium containing instructions stored thereon, which, when executed by a server configured to support a plurality of client applications that are configured for execution on a client device, cause the server to perform operations, the instructions comprising:

at least one instruction for causing the server to register each of the plurality of client applications with the server;

at least one instruction for causing the server to obtain application-to-application communicative information for facilitating communication between the plurality of client applications;

at least one instruction for causing the server to provide the application-to-application communicative information to a first of the plurality of client applications;

at least one instruction for causing the server to receive, based on the application-to-application communicative information provided to the first client application, a given registration request message from the client device that includes (i) a request for renewing the first client application's registration with the server, and (ii) one or more requests for renewing registrations for one or more other client applications from the plurality of client applications; and at least one instruction for causing the server to renew the registrations for the first client application and the one or more other client applications in response to the given registration request message.

* * * * *